June 25, 1963 J. G. D. MANWARING 3,095,548
RADIO FREQUENCY RESONANT CIRCUIT, UTILIZING CONFRONTING PARALLEL CONDUCTIVE PLATES HAVING CURRENT FLOW IN OPPOSITE DIRECTIONS
Filed July 18, 1961 3 Sheets-Sheet 1

June 25, 1963 J. G. D. MANWARING 3,095,548

RADIO FREQUENCY RESONANT CIRCUIT, UTILIZING CONFRONTING PARALLEL CONDUCTIVE PLATES HAVING CURRENT FLOW IN OPPOSITE DIRECTIONS

Filed July 18, 1961

3 Sheets-Sheet 2

June 25, 1963 J. G. D. MANWARING 3,095,548

RADIO FREQUENCY RESONANT CIRCUIT, UTILIZING CONFRONTING PARALLEL CONDUCTIVE PLATES HAVING CURRENT FLOW IN OPPOSITE DIRECTIONS

Filed July 18, 1961 3 Sheets-Sheet 3

3,095,548

RADIO FREQUENCY RESONANT CIRCUIT, UTILIZING CONFRONTING PARALLEL CONDUCTIVE PLATES HAVING CURRENT FLOW IN OPPOSITE DIRECTIONS

Joshua G. D. Manwaring, Needham, Mass., assignor to Radio Frequency Company Inc., Medfield, Mass., a corporation of Massachusetts Filed July 18, 1961, Ser. No. 128,326
21 Claims. (Cl. 333—76)

This invention relates to radio frequency circuitry and components and more particularly to a novel resonant circuit having lumped capacitance and inductance especially useful at high frequencies and at high powers, such as in induction or dielectric heating apparatus.

Ever since the introduction of radio frequency heating on a commercial scale, attempts have continued to be made to increase the available radio frequency power so that a decrease in heating time might be achieved and so lower the cost of the product being so heated. At the same time, it was found desirable for a variety of reasons to raise the frequency of the generated energy because by so doing the speed of heating of many substances was not only increased, but other substances particularly those of high resistivity such as certain semi-conductor materials which could not successfully be so heated at lower frequencies, were thereby brought within the class of substances that could be heated by radio frequency energy.

However, the generation of radio frequency energy at reasonable apparatus cost has been a real problem in the art, especially at high powers of the order of several kilowatts and at high frequencies particularly of the order of 100 megacycles. Much of the problem has been due to the inadequacy of the conventional tank circuits long utilized in this art. Not only is it expensive to construct such circuits, but their efficiency leaves much to be desired at high powers and frequencies. Furthermore, such circuits are subject to instability, especially as the higher frequencies are approached, so that it becomes difficult with conventional tank circuits, for example, to utilize at high frequencies a self-excited oscillator such as is commonly used in radio frequency induction heating apparatus. This is partly caused by variations in the load which frequently occur during the heating cycle to change its capacitance and hence cause the oscillator to cease oscillating. As a general statement, these problems have limited high powered heating apparatus to frequencies substantially less than 100 megaycles, although it was known that higher frequencies were usually advantageous and sometimes essential to the successful heating of specific substances.

Accordingly, it is an object of the present invention to provide novel circuitry and components capable of operating at high powers and medium as well as at high frequencies in excess of 100 megacycles and particularly useful in induction and dielectric heating apparatus as well as in other radio frequency apparatus.

It is another object of the invention to provide a lumped constant resonant circuit component of high efficiency and stability even at frequencies in excess of 100 megacycles, and one which may be manufactuered relatively simply and at reasonable cost.

In brief, the objects of the present invention have been achieved by providing a lumped constant resonant circuit component consisting of one or more pairs of generally parallel conductive plates closely spaced from one another for capacitive coupling therebetween. The plates are electrically connected at a common point, and each plate of a pair has a dissimilar configuration, provided, for example, as by suitably arranged slots or holes defining radio frequency current paths in opposite directions in paths spaced in the plane of the plates, in effect providing a pair of series connected mutually inductively coupled inductors with the common point at the connection thereof. In use, a radio frequency power means, such as a suitable electronic tube, is connected between the common point and to another point remotely spaced therefrom on one of the plates. Normally, the low energy level end of the circuit is at the common connection, with the high energy level of each pair of plates at the opposite end, to one of which plates the high energy level terminal of the radio frequency power source is connected. So connected circulating radio frequency current will flow in each pair of plates in opposite sense, as well as between them by reason of the capacitive and inductive coupling which is present mainly adjacent their high energy level ends remote from their common connection. Multiple pairs of plates are especially desirable in order to provide a compact unit having a high capacitance relative to its inductance, since the capacitance of successive pairs of plates will be in parallel and hence additive, while the inductance will be in parallel and hence will decrease as more pairs of plates are assembled. The invention is capable of wide variations in plate form, as will appear hereinafter, so long as the above stated principles are observed.

For the purpose of explaining further objects and features of the invention, reference is now made to the following detailed description, together with the accompanying drawings, wherein.

Figure 1:
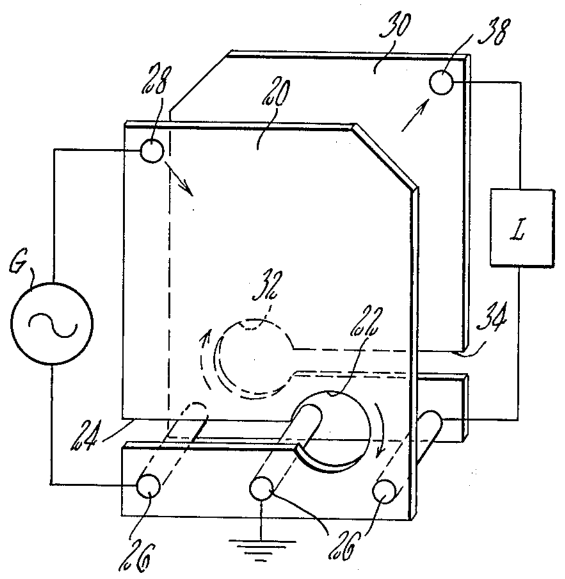
FIG. 1 is an isomeric view of a simple form of the novel lumped constant stacked plate resonant radio frequency circuit component of the invention, with a radio frequency generator and a load connected thereto.

Before discussing in detail the specific configurations shown in the drawings of the lumped constant stacked plate resonant circuit component of the invention, it should be pointed out that each of them consists of one or more parallel pairs of closely spaced conductive plates, connected at a common point, with the plates cooperating to provide a capacitance and a pair of mutually coupled inductances having their junction at the common connection point. The latter requires that the plates differ in their assembled configuration, so that current paths are

Figures 6, 7, 8, 9:
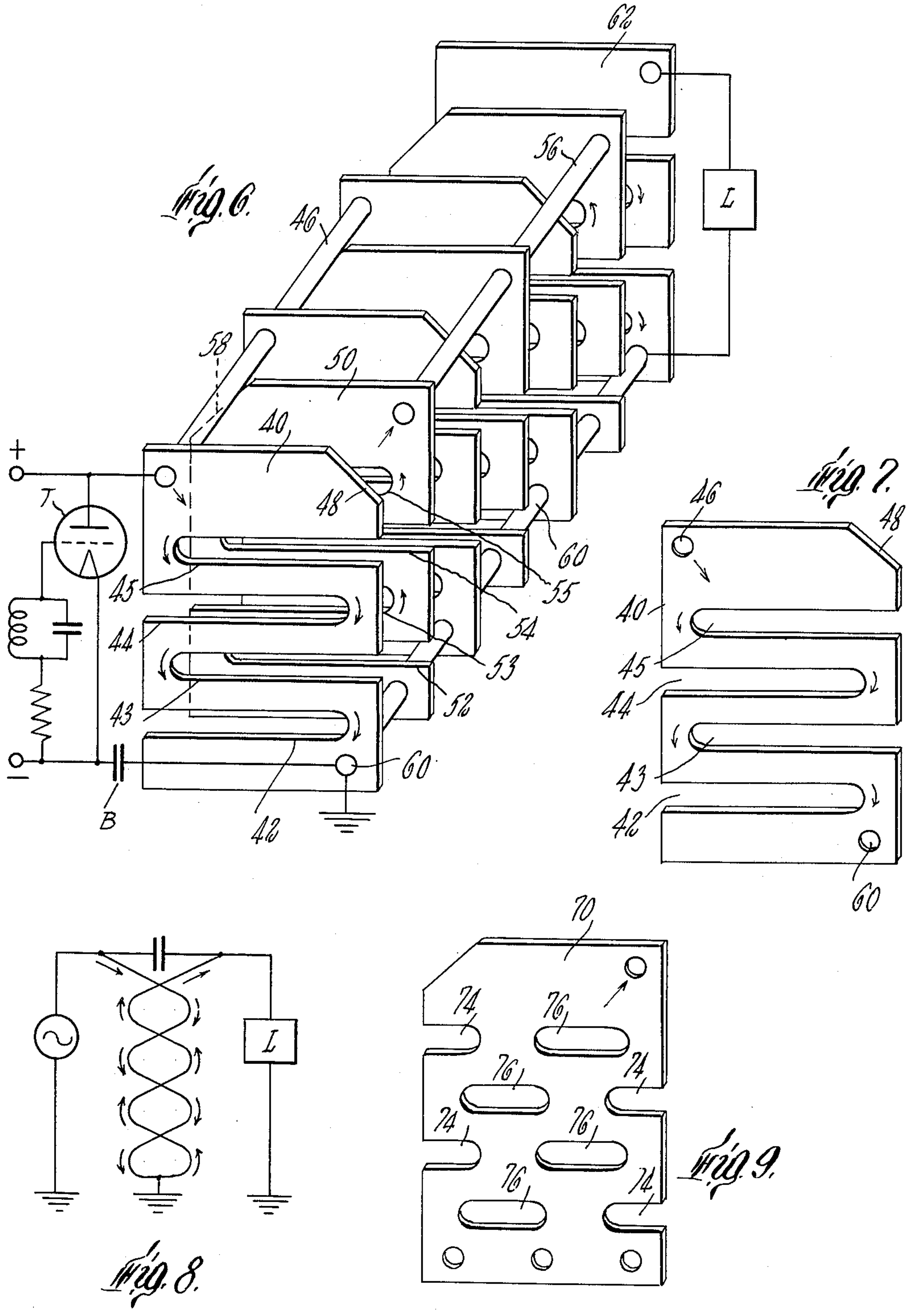
FIG. 6 is an isometric view of another lumped constant stacked plate resonant circuit component of the invention, having relatively movable plates and with a radio frequency generator and a load connected thereto.
FIG. 7 is a view of one plate of each of the pairs of plates of the circuit component of FIG. 6.
FIG. 8 is a diagrammatic view of the instantaneous current flow along the plates of the component of FIG. 6.
FIG. 9 is a view of another plate similar to but having more openings and slots than the plates of the circuit component of FIG. 6.

[redacted]

provided, then, in any two successive paths are such that currents flowing in opposite directions are transversely spaced from one another in the plane of the plates so that all of such plates will be inductively coupled to one another. The specific current path is best shown in FIG. 8, and is in the form of a multiple twisted loop, similar to a figure of eight with four loops. This current path provides suitably spaced, although crossing, current paths which establish the necessary inductive current paths.

The above described component is shown in a self-excited oscillator circuit, wherein a vacuum tube T having a grid circuit tuned to the same frequency as the plate tank component is utilized as a radio frequency power source. In order to permit electrically grounding the spacers 60, a blocking capacitor B is used to couple the cathode of tube T to ground, so that positively grounded high D.C. voltage may be applied across the tube T. Coupling of the plate tank component to a load L is provided in the circuit of FIG. 6 by a coupling plate 62, identical with an input plate 40 since it must cooperate with an output plate 50, being electrically connected thereto by spacers 60. Other coupling means could be used, or the load might be directly connected between spacers 56 and 60, for example.

Figure 2:
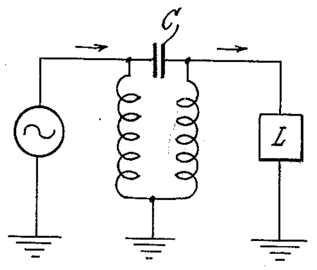
FIG. 2 is an idealized theoretical equivalent circuit of the circuit of FIG. 1.
Figure 3:
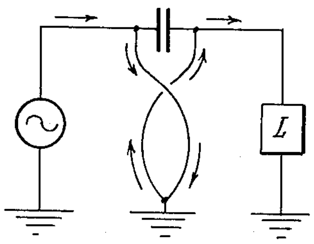
FIG. 3 is a diagrammatic view of the instantaneous current flow along the plates of the component in FIG. 1.

The theoretical equivalent circuit is believed to be similar to that shown in FIG. 2, but wherein the single capacitance is the sum of the paralleled capacitances between adjacent pairs of plates. From this explanation, the unique capacitance addition achieved by the use of multiple pairs of plates becomes apparent. At the same time, the mutually coupled series inductaces of each pair, are thereby arranged in parallel circuits so that the total value of inductance decreases with an increase in the number of pairs of plates, although all of the inductances remain mutually coupled to one another. It is this unique effect which provides the high C circuit characteristic of the component of the present invention, which, as has been pointed out above, provides improved stability as is important particularly in situations wherein a load coupled to the circuit changes its capacitive reactance during operation of the circuit.

The coupling plate 62 operates simply as an inductive loop both inductively and capacitively coupled to the component of the invention, the load L being connected across it as shown.

Figure 4:
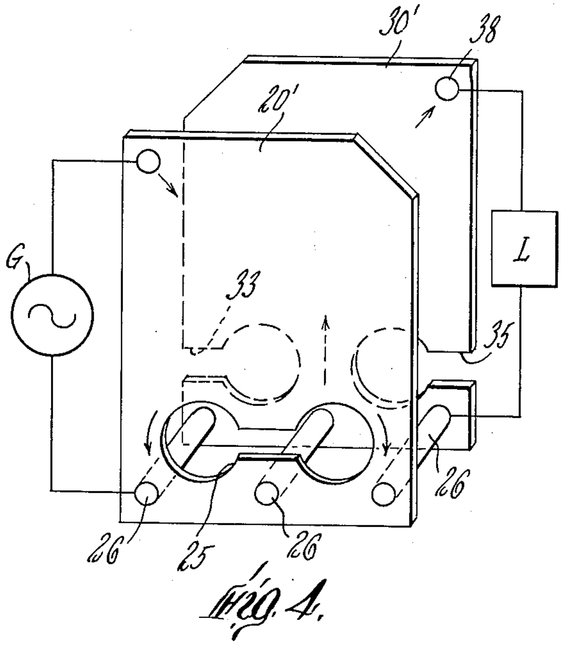
FIG. 4 is another isometric view of a simple form of the novel lumped constant stacked plate resonant radio frequency circuit component of the invention, with a radio frequency generator and a load connected thereto.
Figure 5:
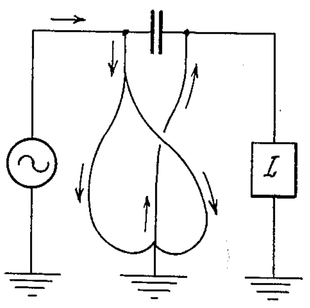
FIG. 5 is a diagrammatic view of the instantaneous current flow along the plates of the component of FIG. 4.

As practical examples of components having the plate configuration of the FIGS. 6 and 7, with the plates being of 4 x 6 inches, and a plate spacing of ½ inch made up with increasing numbers of pairs of plates, the resonant frequencies and the capacitance and inductance values with two plates provided a resonant frequency of 110 megacycles, whereas upwards of six plates provided a resonant frequency of about 90 megacycles, with capacitances of 100–200 mmf. as is preferred. It should be noted from this example, in comparison with the examples of FIGS. 1 and 4, that an increase in the size of slots or other openings tends to reduce the resonant frequency of a component according to the invention, apparently because of the higher inductances provided by longer and more sinuous current paths. Too, the major area of capacitance is better positioned at the high energy end of the plates for maximum effectiveness.

Even more slots and openings may be provided than is shown in the configuration of FIGS. 6 and 7, as is shown in FIG. 9 wherein a plate 70 is provided having four rows each with a slot 74 and successive opening 76.

Figures 10, 11, 12:
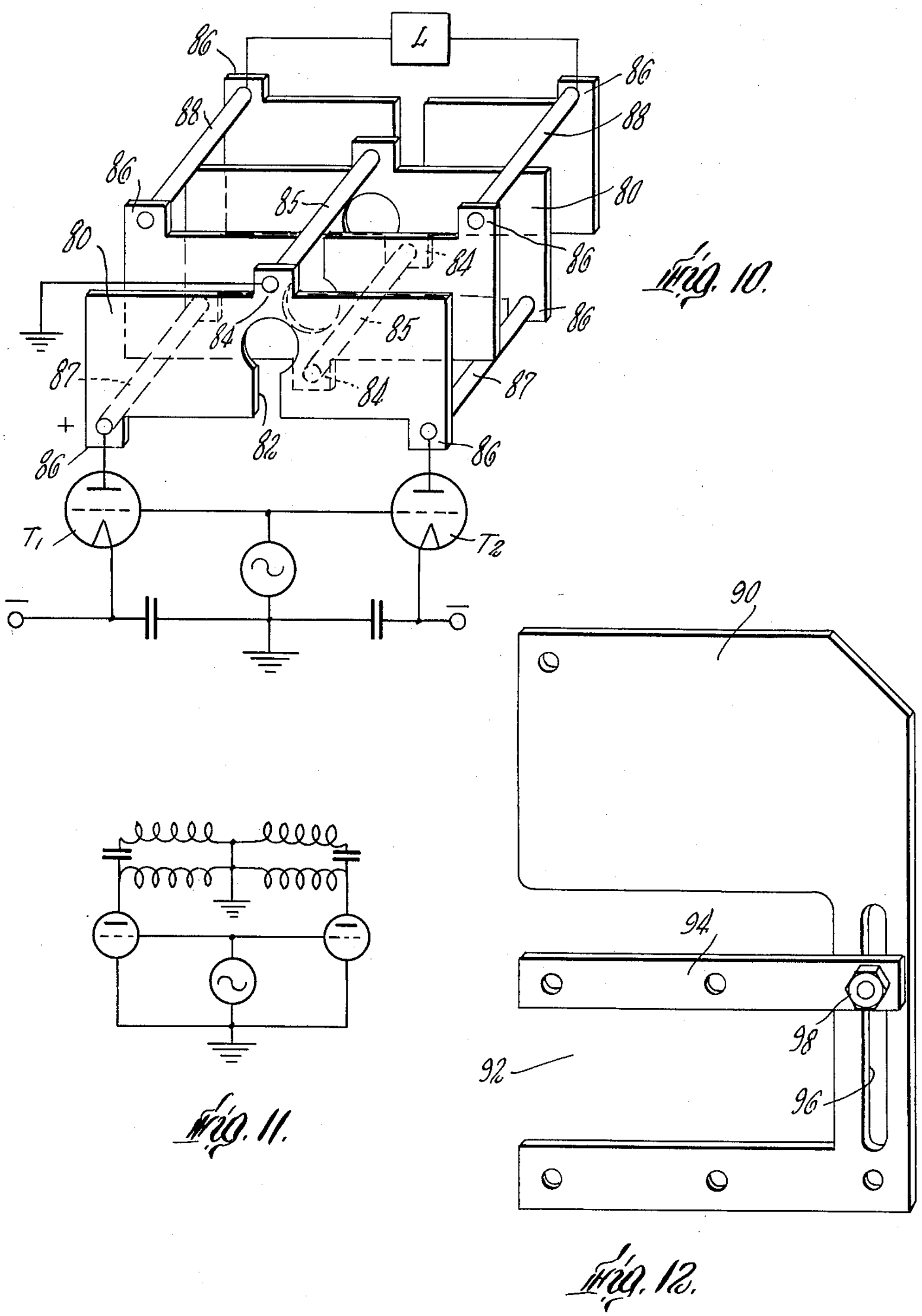
FIG. 10 is an isometric view of another lumped constant stacked plate resonant circuit component of the invention, of the double ended type and with a pair of tubes and a load connected thereto.
FIG. 11 is an idealized theoretical equivalent circuit of the circuit of FIG. 10.
FIG. 12 is an isometric view of a plate of another lumped constant stacked plate resonant circuit component of the invention, of a tunable type.

In FIG. 10 is shown a component, according to the invention, of the double ended or push-pull type. For convenience, but two pairs of plates are shown, the plates of each pair being identical but reversed to provide the transversely spaced current paths characteristic of the invention. Thus, each plate 80 has a central slot 82 and a central tab 84 adjacent the closed end of said slot. Tabs 86 are provided adjacent the ends of the plates on the slotted edge thereof. The central tabs 84 are all connected together at each side thereof by spacers 85 which are grounded. The tabs 86 of the first and third plates 80 are connected together by spacers 87, and the tabs 86 of the second and fourth plates connected together by spacers 88. As shown, a pair of vacuum tubes $T_1$ and $T_2$ arranged for push-pull operation are connected to spacers 87 and the load L is connected between the spacers 88.

The equivalent circuit is shown in FIG. 11, wherein it will be seen that, as with the single ended circuits described above, the capacitances are additive not only as to the pairs of plates, but also between the pairs of plates. Again, the inductances are in parallel circuit as between the pairs of plates, so that the net effect is to provide a high C circuit to an unexpected degree by utilizing multiple pairs of plates.

Although with the above specifically described components the plates of a pair are generally mirror images of one another in the sense that they simply need be turned over in order to provide current paths in the opposite sense, it should be noted that such is not a necessary requirement for the functioning of plate assemblies in accordance with the principles of the invention in that plate configurations can be provided which need not be such mirror images, but nevertheless function by their provision of transverse current paths.

Although each of the above described reasonant circuit components of the invention has been shown and described as a fixed tuned resonant circuit component, it is apparent that they may be made tunable over a range of frequencies by moving their plates relatively to one another in order to vary the capacitance of the circuit so that it will resonate at another frequency. This may be accomplished by moving one of the plates of each of the pairs relatively to the other of the plates thereof, as by swinging one set relatively to the other much as in the manner of a conventional tunable capacitor. Thus, with the structure of FIG. 6, plates 40 may be swung as a group relatively to plates 50 about spacers 60 as a shaft, to give a practical range of 90 to 150 megacycles with upwards of three pairs of plates. Alternatively, the spacing between the plates might be changed. It should be noted particularly with this arrangement that the forces and mechanical arrangement for swinging or otherwise moving alternate plates relatively to one another may be applied at an electrical ground point, i.e., spacers 60 of FIG. 4, so that radio frequency voltage problems do not arise in this regard.

Another tunable arrangement is shown in FIG. 12, wherein a series of alternated plates 90 may be provided with a single wide slot 92 adjacent their lower energy end, and a shorting member 94 extending across said slot perpendicular to its opening and movable therealong. Such member 94 may be suitably mounted in an elongated slot 96 and clamped by a suitable bolt 98 for ready adjustability. With upwards of three pairs of such plates, alternated with their slots or opposite sides as before and with all of their shorting members 94 connected and movable together, with plate sizes of 8 x 12 inches and ½ inch spacing, a frequency range of about 40 to 120 megacycles may be achieved apparently mainly by varying the inductive reactance of the assembly.

To summarize, the paired plate configuration of the invention defines radio frequency current paths in opposite directions in transversely spaced paths to provide a pair of connected inductors having a low energy point at the connection and two high energy points remote therefrom generally at the other end of the plates from the connection therebetween. Thus the low energy point is electrically half way between the two high energy points, and each plate of a pair provides one half of the inductance of the radio frequency tank circuit, with the capacitance being provided between the plates of the pair. The radio frequency generator is connected across one plate only of the pair, so that with a conventional vacuum tube utilized as a radio frequency power generator, for current path in one series of plates of opposite direction from those in the other series of plates, said path in said one series of plates being transversely spaced in a direction parallel to the plane of the plates from said path in said other series of plates.

20. A tuned radio frequency circuit component consisting of a plurality of generally parallel electrically conductive plates spaced from one another in a direction perpendicular to the plane of the plates, said plates forming two series of plates arranged alternately with one another, and connected at a common point to provide a common connection, with the plates of at least one of said series being connected together at points remote from said common point to provide at least one independent series of remote connection points, with the plates of each series having slot means of similar configuration within its series and of different configuration with the plates of the other series, said slot means defining a radio frequency current path in one series of plates of opposite direction from those in the other series of plates, said path in said one series of plates being transversely spaced in a direction parallel to the plane of the plates from said path in said other series of plates.

21. A radio frequency circuit including a tuned radio frequency circuit component consisting of a plurality of generally parallel electrically conductive plates spaced from one another in a direction perpendicular to the plane of the plates, said plates forming two series of plates arranged alternately with one another, and connected at a common point to provide a common connection, with the plates of each of said series having points remote from said common point to provide two independent series of remote connection points, and with the plates of each series having slot means of similar configuration within its series and of different configuration with the plates of the other series, said slot means defining a radio frequency current path in one series of plates of opposite direction from those in the other series of plates, said path in said one series of plates being transversely spaced in a direction parallel to the plane of the plates from said path in said other series of plates, and radio frequency generator means connected between said common point and one only of said series of remote connection points.

References Cited in the file of this patent

UNITED STATES PATENTS

| | | |
|---|---|---|
| 2,449,317 | Pitman | Sept. 14, 1948 |
| 2,824,966 | Buggy | Feb. 25, 1958 |
| 2,848,672 | Harris | Aug. 19, 1958 |
| 2,852,653 | Kooi | Sept. 16, 1958 |
| 2,858,440 | Giacoletto | Oct. 28, 1958 |
| 3,001,069 | Hubbard | Sept. 19, 1961 |

OTHER REFERENCES

Dittrich: Design of Laminated Circuits, Mullard Technical Communications, December 1959, volume 5, No. 41, pages 26–31, TK 5101–M7.